United States Patent [19]

Brinkman et al.

[11] 4,378,339

[45] Mar. 29, 1983

[54] AMMONIUM THIOSULFATE PRODUCTS AND METHODS OF MAKING THE SAME

[75] Inventors: Max R. Brinkman, Mt. Pocono; Harold E. Ingraham; William G. Robertson, both of East Stroudsburg, all of Pa.

[73] Assignee: Heico, Inc., Delaware Water Gap, Pa.

[21] Appl. No.: 45,658

[22] Filed: Jun. 5, 1979

[51] Int. Cl.$^3$ .............................................. C01B 17/64
[52] U.S. Cl. .................................... 423/265; 423/274; 423/514
[58] Field of Search .................... 423/265, 274, 514; 23/302 A

[56] References Cited

U.S. PATENT DOCUMENTS 2,412,607 12/1946 Farr et al. .......................... 423/514
3,345,131 10/1967 Ingraham ........................... 423/514

FOREIGN PATENT DOCUMENTS 2635649 2/1978 Fed. Rep. of Germany ...... 423/514
1506030 12/1967 France .

OTHER PUBLICATIONS

Mueller, "Chem. Abstracts", vol. 62, 1965, 8713d.

*Primary Examiner*—Jack Cooper
*Attorney, Agent, or Firm*—Buell, Blenko & Ziesenheim & Beck

[57] ABSTRACT

An ammonium thiosulfate product and method of making the same are provided in which the product is ammonium thiosulfate crystals with a film of water, i.e. about 80% to 90% ammonium thiosulfate with 10% to 20% water and preferably about 85% ammonium thiosulfate and 15% water at a pH of about 8 to 10, preferably about 9 and preferably produced by adding anhydrous ammonium thiosulfate to a 60% solution of ammonium thiosulfate or by vacuum separation of water from a 60% solution of ammonium thiosulfate to produce a product at about 80% to 90% ammonium thiosulfate.

3 Claims, No Drawings

AMMONIUM THIOSULFATE PRODUCTS AND METHODS OF MAKING THE SAME

This invention relates to ammonium thiosulfate products and methods of making the same and particularly to a stable ammonium thiosulfate product of high concentration which will not break down in storage, has high flowability characteristics and can be shipped and packaged without breakdown.

Ammonium thiosulfate is shipped and stored, at the present time, almost exclusively in the form of a water solution containing from 57 percent to 60 percent by weight of anhydrous ammonium thiosulfate, $(NH_4)_2S_2O_3$. It has been found necessary to ship and store ammonium thiosulfate in water solution at about 57% to 60% by weight of anhydrous ammonium thiosulfate because the ammonium thiosulfate in the anhydrous condition decomposes spontaneously, yielding various decomposition products of which elemental sulfur is the most objectionable. These decomposition products do not dissolve completely so that anhydrous ammonium thiosulfate in which decomposition has occurred yields a murky solution which is generally unusable for those purposes for which it is desired. On the other hand, the usual 57% to 60% solution is expensive to ship and relatively difficult to handle.

A very real saving in shipping and storage costs could be effected if the decomposition of anhydrous ammonium thiosulfate could be prevented or a product generally approaching the concentration of anhydrous ammonium thiosulfate could be provided. Since the annual consumption of ammonium thiosulfate in the United States exceeds 20,000,000 lbs., it is obvious that the savings in shipping and handling are of substantial economic significance.

A great deal of work has been done over the years in attempts to solve this problem. For example, Ingraham U.S. Pat. No. 3,345,131 provides a method of making an anhydrous ammonium thiosulfate product which is highly resistant to decomposition. While this is a very satisfactory method, it involves compressing the crystals into briquettes which introduces added expense and produces a very dense product. Attempts to reduce the amount of water by concentration of the solution beyond 60% have apparently not been attempted because precipitation of crystals occurs at this point and this precipitated product has not been considered acceptable.

We have discovered that a product containing between 80% and 90%, preferably about 85% anhydrous ammonium thiosulfate, is completely stable, yet very flowable and readily handled. The product of this invention has the general characteristics of solid anhydrous ammonium thiosulfate yet retains the stability of a solution of ammonium thiosulfate. The pH of the product must be maintained in the pH range 8 to 10 and preferably about pH 9. We have found that there must be present sufficient solution water in the product to form a slight aqueous film on the crystals. The product can be shipped in polyethylene plastic bags, or lined drums exactly like a solid chemical product which it resembles. It may be used as any other conventional ammonium thiosulfate product, i.e. simply add water to bring it to the desired concentration. In addition any of the usual additives incorporated into ammonium thiosulfate may be incorporated with this product with no change in the character of the result.

The product of this invention may be made by adding sufficient fresh non-decomposed anhydrous ammonium thiosulfate to a 60% solution of ammonium thiosulfate to produce a concentration of about 80% to 90%. Alternatively, the product may be made by vacuum concentration of a 60% solution to obtain a product having a concentration of about 80% to 90% anhydrous ammonium thiosulfate.

The following examples are given by way of description to indicate the manner in which the invention can be carried out.

EXAMPLE 1

One liter of a 60% solution of ammonium thiosulfate at pH 9 was vacuum concentrated to 85% anhydrous ammonium thiosulfate by removing water. The resulting product had the general appearance of a crystalline product but was damp to the touch. The product was very flowable and could be poured from container to container like a crystalline product. The product was stored in a polyethylene bag for six months and checked for decomposition and solubility. At the end of the six-month period no decomposition had occurred and on reconstituting to 60% solution by the addition of water, the product had precisely the same characteristics as a fresh 60% solution.

EXAMPLE 2

One liter of a 60% solution of anhydrous ammonium thiosulfation was admixed with sufficient fresh anhydrous ammonium thiosulfate to provide a solution of 85% anhydrous ammonium thiosulfate. As in the case of Example 1, the finished product had a damp feel on touch, was readily flowable and could be poured from one container to another like a crystalline product. Again the product was stored in a polyethylene bag for six months and tested with precisely the same results as the product of Example 1.

EXAMPLE 3

A product was prepared according to Example 2 to provide increments of 0.5% from 80% to 90% anhydrous ammonium thiosulfate with results similar to those of Example 2.

Below 80% solids the product became too wet and sticky to handle satisfactorily. Above about 90% some decomposition occurred, particularly in samples stored at elevated temperature.

In the foregoing specification we have set out certain preferred embodiments and practices of our invention, however, it will be understood that this invention may be otherwise practiced within the scope of the following claims.

We claim:

1. A stable flowable ammonium thiosulfate product comprising about 80% to 90% ammonium thiosulfate crystals surrounded by a film of water at a pH in the range 8 to 10 making up the balance.

2. A stable ammonium thiosulfate product as claimed in claim 1 having about 85% ammonium thiosulfate crystals and the balance water.

3. A stable ammonium thiosulfate product as claimed in claims 1 or 2 wherein the pH is about 9.

* * * * *